(12) United States Patent
Kinpara

(10) Patent No.: US 11,165,314 B2
(45) Date of Patent: Nov. 2, 2021

(54) ROTOR MANUFACTURING METHOD

(71) Applicant: TOYOTA JIDOSHA KABUSHIKI KAISHA, Toyota (JP)

(72) Inventor: Hiroshi Kinpara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 16/215,712

(22) Filed: Dec. 11, 2018

(65) Prior Publication Data

US 2019/0181733 A1    Jun. 13, 2019

(30) Foreign Application Priority Data

Dec. 12, 2017 (JP) .............................. JP2017-238053

(51) Int. Cl.
| | |
|---|---|
| *H02K 15/02* | (2006.01) |
| *H02K 15/10* | (2006.01) |
| *H02K 15/03* | (2006.01) |
| *H02K 15/12* | (2006.01) |
| *H02K 7/00* | (2006.01) |
| *H02K 1/27* | (2006.01) |
| *H02K 15/00* | (2006.01) |

(52) U.S. Cl.
CPC ............. *H02K 15/03* (2013.01); *H02K 1/272* (2013.01); *H02K 7/003* (2013.01); *H02K 15/00* (2013.01); *H02K 15/02* (2013.01); *H02K 15/12* (2013.01)

(58) Field of Classification Search
CPC ........ H02K 15/02; H02K 15/03; H02K 15/12; H02K 7/003; H02K 1/272
See application file for complete search history.

(56) References Cited

U.S. PATENT DOCUMENTS

| | | | | |
|---|---|---|---|---|
| 4,660,269 | A * | 4/1987 | Suzuki ................... | F01L 1/047 |
| | | | | 29/523 |
| 5,157,292 | A * | 10/1992 | Morrill ............... | B22D 19/0054 |
| | | | | 29/598 |
| 2006/0158053 | A1 * | 7/2006 | Aschoff ................... | H02K 1/30 |
| | | | | 310/91 |

FOREIGN PATENT DOCUMENTS

| | | |
|---|---|---|
| JP | 05-038101 A | 2/1993 |
| JP | 2005-295745 A | 10/2005 |
| JP | 2008-253004 A | 10/2008 |
| JP | 2013162640 A | 8/2013 |

* cited by examiner

*Primary Examiner* — Paul D Kim
(74) *Attorney, Agent, or Firm* — Sughrue Mion, PLLC

(57) ABSTRACT

A mandrel formed of urethane is inserted into a hollow shaft and is compressed axially by a die and a pad. The shaft is then fit in a shaft through hole of a rotor core. Thereafter, compression of the mandrel is released or reduced, and the mandrel is removed from the shaft. Thus, in fitting the hollow shaft in the shaft through hole of the rotor core, deformation of the shaft is reduced.

6 Claims, 4 Drawing Sheets

ROTOR MANUFACTURING METHOD

CROSS REFERENCE TO RELATED APPLICATION

The disclosure of Japanese Patent Application No. 2017-238053 filed on Dec. 12, 2017 including the specification, claims, drawings, and abstract is incorporated herein by reference in its entirety.

TECHNICAL FIELD

The present disclosure relates to a rotor manufacturing method, and more particularly to a fit between a rotor core and a shaft.

BACKGROUND

A rotor of a rotary electric machine typically includes a rotor core having a shaft through hole, and a shaft configured to be inserted and secured in the shaft through hole.

Patent Document 1 listed below describes a method including inserting a mandrel having an outer surface with protrusions and recesses into a hollow shaft to plastically deform the shaft. The plastic deformation causes the outer surface of the shaft to be urged against the interior of a shaft through hole of the rotor core for securing.

Patent Document 2 listed below describes use of a hollow shaft having an inner surface with spine fit grooves as a rotor shaft.

Patent Document 3 listed below describes a method of inserting a hollow cylindrical member which is easily deformed radially into a bore in a frame body. In this method, fluid is supplied to an insertion shaft portion disposed inside the cylindrical member to expand and forcibly deform the cylindrical member. The cylindrical member is then inserted into the bore. Thereafter, expansion of the cylindrical member is released and the insertion shaft portion is removed. When inserting the cylindrical member, there is a small clearance between the bore in the frame body and the cylindrical member; therefore, a loose fit is assumed.

CITATION LIST

Patent Literature

[PATENT DOCUMENT 1] JP 2005-295745 A
[PATENT DOCUMENT 2] JP 2008-253004 A
[PATENT DOCUMENT 3] JP H05-038101 A

SUMMARY

Technical Problem

In the process of fitting a hollow shaft to a shaft through hole of a rotor core to form a rotor, force from the shaft through hole may be exerted onto the shaft. When the internal diameter of the shaft through hole is smaller than the external diameter of the shaft and an interference fit is therefore performed, significant force to deform the shaft is applied to the shaft. Even for a rotor including a shaft having an external diameter which is smaller than the internal diameter of a shaft through hole, significant force to deform the shaft may also act on the shaft when the dimension accuracy of the shaft through hole or the operation accuracy during the fit is low, for example.

Embodiments of the present disclosure are directed toward reducing deformation of a hollow shaft in fitting the hollow shaft to a shaft through hole of a rotor core.

Solution to Problem

In accordance with an aspect of the disclosure, a method of manufacturing a rotor includes inserting an elastic member into a hollow shaft and axially compressing the elastic member, and then fitting the shaft to a shaft through hole of a rotor core, and after the fitting, releasing or reducing compression of the elastic member and removing the elastic member from the shaft.

A rotor is disposed inside a stator in a rotary electric machine and rotates. A rotor includes a shaft which is a rotational shaft, and a rotor core disposed around the shaft. The shaft is an elongated component having a hollow interior. The hollow portion may be a through hole having a first end communicating with a second end, or a deep hole having an opening only at a first end and having no opening at a second end. The hollow shaft may have a cylindrical shape (having a circular wall face section), an elliptic cylindrical shape (having an elliptic wall face section), or a polygonal cylindrical shape (having a polygonal wall face section), for example.

In fitting, a shaft through hole of the rotor core and a shaft are fit together. In the fit, an elastic member is inserted into the shaft and is axially compressed. Elastic members, when compressed, are more likely to deform relatively easily and exhibit a relatively wider range of linear deformation (elastic deformation) as compared to general materials. The elastic member, when compressed, deforms in the compression direction and simultaneously expands in a direction perpendicular to the compression direction. Therefore, the elastic member, when compressed axially, expands radially to be pressed against the inside of the shaft, which increases the pressure inside the shaft. This internal pressure, which counteracts the external force exerted to the shaft, prevents deformation of the shaft receiving significant force during the fit. The degree of compressive force to be applied to the elastic member may be determined according to the degree of deformation of the shaft.

The composition of the elastic member is not particularly limited; the elastic member may be of a resin such as urethane, rubber, and the like. While the elastic member may have any shape, the elastic member, when appropriately compressed to radially expand, needs to press the shaft to sufficiently increase the internal pressure of the shaft. In one example, if the shaft has a cylindrical shape having an axially fixed internal diameter, the elastic member has a column shape having an external diameter which is slightly smaller than the internal diameter of the shaft.

In removing, the elastic member is removed after fitting the shaft and the shaft through hole together. If the elastic member deforms within the elastic region, a reduction in the compression decreases the degree of deformation of the elastic member, and a release of the compression restores the elastic member in its original shape. Consequently, the elastic member should be removed from the shaft immediately. Even if the elastic member is compressed beyond the elastic region, but only by a small degree, the elastic member somewhat restores its original shape. Therefore, during the fit, the elastic member should be compressed within a range in which it can be removed from the shaft.

During the removal, a reduction or release in the compression of the elastic member decreases the interior pressure of the shaft, and the shaft is pressed by the shaft through hole to have a slightly reduced diameter. As the degree of reduction in the diameter is small, the possibility of distorted deformation of the shaft having instantaneous reduction in the diameter is deemed to be small. However, when it is possible to reduce the distortion of the shaft by gradually increasing the diameter of the shaft, compression of the elastic member may be reduced or released while taking some time as required.

In one embodiment of the present disclosure, the shaft and the shaft through hole are fit by means of an interference fit.

An interference fit is performed when the external diameter of a shaft is larger than the internal diameter of a hole into which the shaft is to be fit. In a normal state where no special external force is applied and approximately room temperature is maintained, the external diameter of the shaft is larger than the internal diameter of the hole, and therefore an interference fit is performed. The interference fit may be performed by means of a press fit, a shrink fit, a warm fit, or a cool fit, for example.

In one embodiment of the present disclosure, the fitting includes axially compressing the elastic member inserted into the shaft, and, with the elastic member being compressed, press fitting the shaft to the shaft through hole of the rotor core.

In one embodiment of the disclosure, the fitting includes heating the rotor core to increase a diameter of the shaft through hole, and, with the elastic member being axially compressed, disposing the shaft in the shaft through hole having an increased diameter, and cooling the rotor core to reduce the diameter of the shaft through hole, to thereby fit the shaft to the shaft through hole.

A fit in which the diameter of the shaft through hole is increased by heating is typically called a shrink fit. Alternatively, a fit in which heating is performed to temperatures of 150° C. or higher or 200° C. or higher may be called a shrink fit, while a fit in which heating is performed to temperatures of lower than 150° C. or lower than 200° C. may be called a warm fit. The insertion and compression of the elastic member may be performed before disposing the shaft in the shaft through hole or after the shaft is disposed in the shaft through hole. As the shrink fit transfers heat from the rotor core to the shaft to heat the elastic member, the elastic member need to be thermally resistant. A flow passage for coolant may be formed on the inner circumferential surface of the shaft or on the outer circumferential surface or interior of the elastic member, for example, to cool the shaft or the elastic member, thereby preventing the elastic member from being heated to high temperatures.

In one embodiment of the disclosure, the shaft has a hollow shape having a through hole axially extending from a first end to a second end, and the fitting includes inserting a die from the first end of the shaft, inserting the elastic member from the second end of the shaft, and pressing the elastic member from the second end of the shaft toward the die to compress the elastic member.

In one embodiment of the disclosure, the shaft has an inner circumferential surface including spline teeth.

Advantageous Effects of Invention

In accordance with one aspect of the disclosure, deformation of the hollow shaft may be prevented when fitting the shaft in the shaft through hole of the rotor core.

It is expected that prevention of deformation is easily implemented by using an elastic member and that the production accuracy is easily increased by finely controlling the compression of the elastic member.

When the inner circumferential surface of the shaft includes spline teeth, it is possible to prevent the spline teeth from being distorted and improperly assembled with corresponding components

BRIEF DESCRIPTION OF DRAWINGS

Embodiments of the present disclosure will be described by reference to the following figures, wherein.

DESCRIPTION OF EMBODIMENTS

Embodiments of the disclosure will be described with reference to the drawings. While specific embodiments are described in the following description to facilitate understanding, these are only examples and various other embodiments may be adopted.

FIG. 1 to FIG. 7 are a series of diagrams schematically illustrating a rotor manufacturing method according to an embodiment in time sequence. In principle, the same elements are denoted with the same numerical references in all the drawings; the numerical references may be omitted for simplification.

Figure 1:
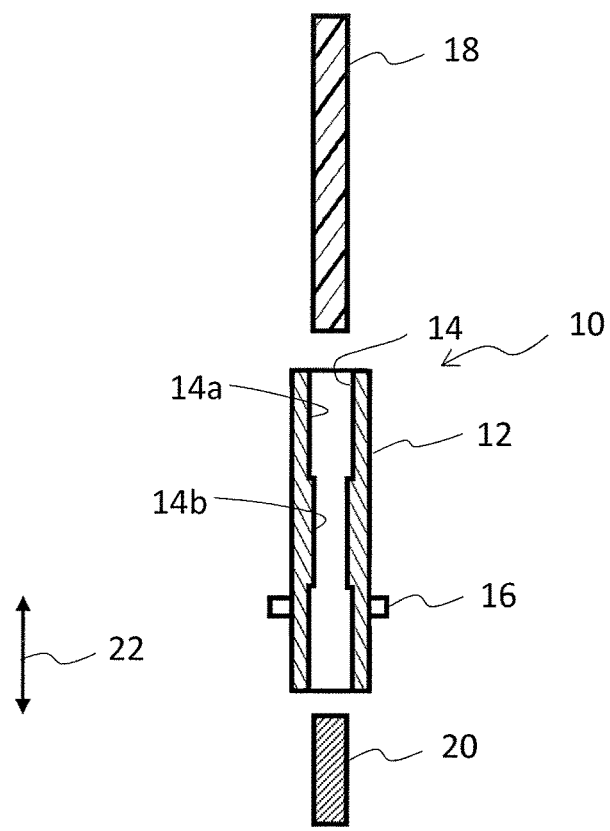
FIG. 1 is a diagram illustrating a preparation stage of a rotor manufacturing process using a press fit according to an embodiment.

FIG. 1 is a cross sectional view of a shaft 10 of a rotor, a mandrel 18 that is used in the manufacturing process, and a die 20 which is a part of a manufacturing apparatus. The shaft 10, which is a rotational shaft of the rotor, is formed of a cylindrical metal member. The shaft 10 has an outer circumferential surface 12 having a cylindrical shape with a uniform diameter in each position in the axial direction (that is, a direction indicated with arrow 22, in which the elongated shaft 10 extends). However, the shaft 10 includes, at a position slightly below an axially central position on the outer surface 12, an annular member 16 for use in positioning or fixing the rotor core.

The shaft 10 also has an inner circumferential surface 14 including a cylindrical portion 14a having a uniform diameter at each position in the axial direction, and spline teeth 14b including a series of tooth-shape grooves extending axially. The spline teeth 14b include projections protruding further inward with respect to the cylindrical portion 14a.

The spline teeth 14b are configured to be engaged with a shaft member to be inserted into the shaft 10 to transmit rotational power.

The mandrel 18 is a cylindrical member formed of urethane which is an elastic resin member. The mandrel 18 has a shape that enables smooth insertion into the shaft 10. Specifically, the mandrel 18 has an external diameter that is smaller than the internal diameter of the cylindrical portion 14a of the shaft 10 on its inner circumferential surface 14 and is slightly smaller than the internal diameter of the projections of the spline teeth 14b.

The die 20 is a metallic cylindrical member having a shape with an external diameter that enables smooth insertion into the shaft 10. The die 20 is attached to a mount of the manufacturing device (not shown) at its lower end portion.

In the stage illustrated in FIG. 1, the shaft 10 is held directly above the die 20 by the manufacturing device. The mandrel 18 is held directly above the shaft 10 by the manufacturing device.

Figure 2:
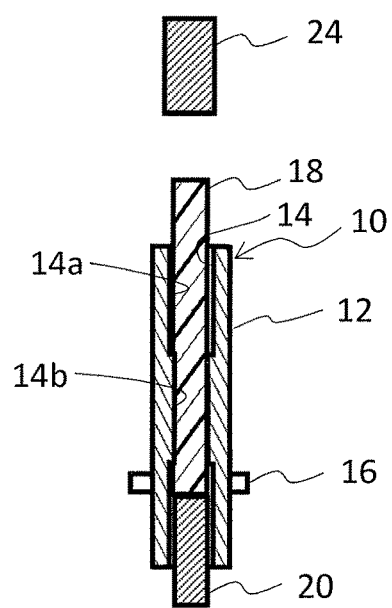
FIG. 2 is a diagram illustrating a state where a die and a mandrel are inserted in a shaft in the rotor manufacturing process according to the embodiment.

FIG. 2 illustrates a process following the process in FIG. 1. In FIG. 2, the manufacturing device inserts the die 20 into the shaft 10 from the lower end. The die 20 is disposed such that its upper end reaches the axial position near the lower end of the annular member 16. The manufacturing device further inserts the mandrel 18 into the shaft 10 from the upper end of the shaft 10. The lower end of the mandrel 18 is in contact with the upper end of the die 20 and the outer circumferential surface of the mandrel 18 is slightly spaced from the inner circumferential surface 14 of the shaft 10. The manufacturing device holds a cylindrical pad 24 configured to press the mandrel 18 directly above the mandrel 18.

Figure 3:
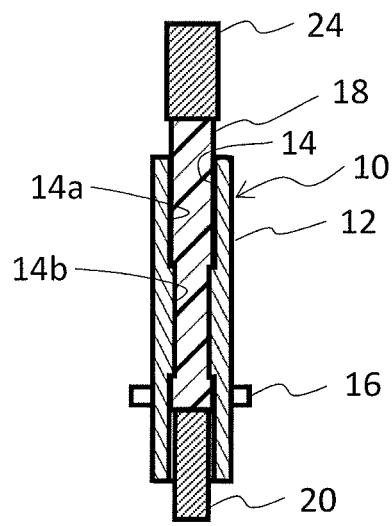
FIG. 3 is a diagram illustrating a state where the mandrel is pressed by a pad in the rotor manufacturing process according to the embodiment.

FIG. 3 illustrates a process following the process in FIG. 2. In FIG. 3, the manufacturing device lowers the pad 24 to press the mandrel 18. The mandrel 18 is pressed by the pad 24 from its upper end portion toward the die 20 and is also pressed toward the pad 24 by receiving a counter force of the die 20 from its lower end portion. The mandrel 18 is thus compressed axially. The mandrel 18, which is formed of elastic urethane, is axially contracted in its length and also expands its diameter toward the inner circumferential surface 14 of the shaft 10 for deformation. This deformation of the mandrel 18 increases with an increase in the axial compression. More specifically, the mandrel 18 expands to first come into contact with the projections of the spline teeth 14b on the inner circumferential surface 14 of the shaft 10, and then further come into contact with the cylindrical portion 14a. Further increase in the compressive force brings the mandrel 18 into contact with the inner circumferential surface 14 of the shaft 10 to stop the increase in the diameter, but increases the force of the mandrel 18 to be pressed against the inner circumferential surface 14. FIG. 3 illustrates a state where the mandrel 18 is in contact with and is pressed against the inner circumferential surface 14 of the shaft 10. In this state, while the shaft 10 is elastically deformed slightly to increase its diameter due to the pressing force from the mandrel 18, the displacement is small. In this state, the counter force of the elastic deformation is balanced with the pressing force from the mandrel 18.

Figure 4:
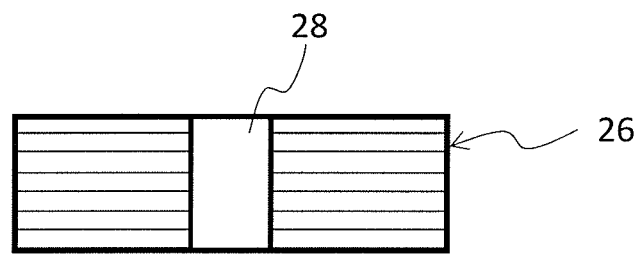
FIG. 4 is a diagram illustrating a state where a rotor core is aligned with the shaft in the rotor manufacturing process according to the embodiment.
Figure 4:
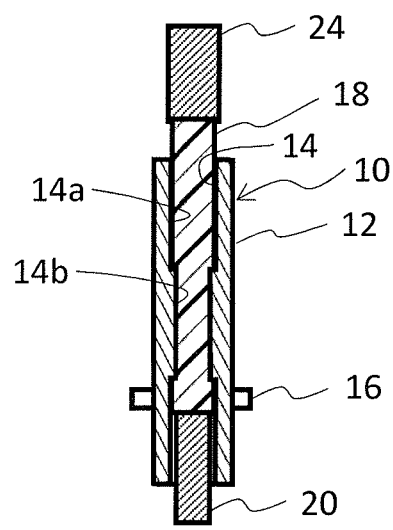

FIG. 4 illustrates a process following the process in FIG. 3. FIG. 4 illustrates a rotor core 26 held above the shaft 10 by the manufacturing device. The shaft 10 maintains the state illustrated in FIG. 3, in which the mandrel 18 is compressed by the shaft 10. The rotor core 26 is a cylindrical component including a stack of a large number of electromagnetic steel sheets each punched into a predetermined shape. The rotor core 26 has, in its center portion, a cylindrical shaft through hole 28 into which the shaft 10 is to be inserted. The shaft through hole 28 has an internal diameter that is slightly smaller than the external diameter of the shaft 10 such that the shaft 10 is interference fit into the shaft through hole 28.

The manufacturing device holds the rotor core 26 such that the shaft through hole 28 is coaxial with the shaft 10. The manufacturing device then moves the rotor core 26 close to the shaft 10 such that a portion of the shaft 10 where the mandrel 18 is inserted is first inserted into the shaft through hole 28. The shaft 10 has a tapered tip end, which enters the shaft through hole 28 for starting the insertion. As the external diameter of the shaft 10 is larger than the internal diameter of the shaft through hole 28, a press fit is performed for insertion. A press fit is one method for performing an interference fit, in which the shaft 10 is forced into the shaft through hole 28 for insertion.

Figure 5:
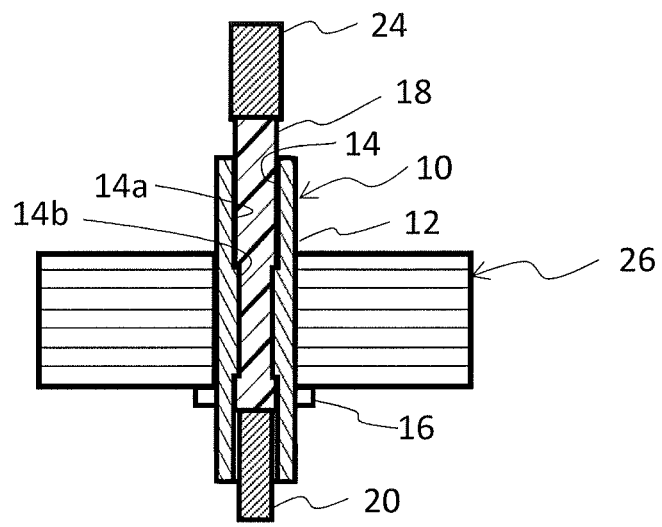
FIG. 5 is a diagram illustrating a state where the rotor core is press fit to the shaft in the rotor manufacturing process according to the embodiment.

FIG. 5 illustrates a process following the process in FIG. 4. FIG. 5 illustrates a state where the press fit of the shaft 10 into the rotor core 26 causes the rotor core 26 to come into contact with the annular member 16.

During the insertion, the shaft through hole 28 of the rotor core 26, receiving force for increasing its diameter from the shaft 10, undergoes some elastic deformation. The outer circumferential surface 12 of the shaft 10, receiving force for decreasing the diameter from the shaft through hole 28, also undergoes some elastic deformation. A contact face between the shaft 10 and the shaft through hole 28 experiences a frictional force in proportion to the reaction. As it is necessary to insert the shaft 10 while overcoming such an elastic deformation and a frictional force, a press fit is performed to apply the overcoming force.

During the press fit, the shaft 10, receiving significant force, may experience elastic deformation to cause the cross sectional shape of the shaft 10 to be distorted from a circle to a flat shape, for example. Further, the shaft 10, experiencing the significant force, may plastically deform beyond the elastic deformation region. However, the shaft 10 according to the present embodiment includes the mandrel 18 which is inserted therein and maintained in the compressed state as illustrated in FIG. 4. The mandrel 18 further presses the inner circumferential surface 14 of the shaft 10 to increase the internal pressure. Therefore, deformation of the shaft 10 is reduced as compared to the shaft without the mandrel 18. Further, as compared to the shaft without the mandrel 18, the shaft 10 of the present embodiment can be press fit with a greater force. In FIG. 5, the internal pressure of the shaft 10 which has been increased by the mandrel 18 prevents plastic deformation of the shaft 10 and also allows the shaft 10 to be inserted in the shaft through hole 28 while maintaining its substantially circular cross section.

Figure 6:
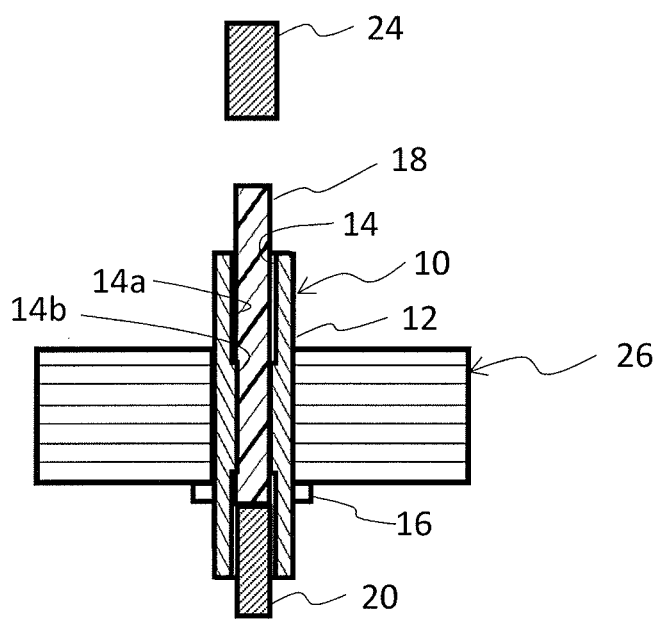
FIG. 6 is a diagram illustrating a state where compression of the mandrel is released in the rotor manufacturing process according to the embodiment.

FIG. 6 illustrates a process following the process in FIG. 5. In FIG. 5, the manufacturing device moves the pad 24 upward to release the compression of the mandrel 18. The mandrel 18, which has been compressed within the elastic region of urethane, restores the original shape illustrated in FIG. 2 upon release of the compression. Specifically, the mandrel 18 axially extends and radially contracts to have a diameter smaller than the internal diameter of the shaft 10.

In the course of restoring the shape of the mandrel 18, the internal pressure of the shaft 10 lowers. This further weakens the force of the shaft 10 urging against the shaft through hole 28, to slightly reduce the diameters of the shaft through hole 28 and the shaft 10. The manufacturing device therefore moves the pad 24 while taking some time to gradually release the compression of the mandrel 18, thereby preventing the shaft 10 from being significantly deformed instantaneously. This prevents the shaft 10 from being plastically deformed to thereby maintain the substantially circular sectional shape of the shaft 10.

The spline teeth 14b formed on the inner circumferential surface of the shaft 10 are not also distorted. Typically, the spline teeth 14b, located at the axial position of the shaft 10 where the rotor core 26 passes through during the press fit process or at the axial position of the shaft 10 where the spline teeth 14b overlap the rotor core 26 in the final stage of the press fit, are likely to receive force from the rotor core 26 and to be distorted. In particular, the spline teeth 14b, which require high precision for engaging with another shaft, may lose precision due to slight distortion of the shaft 10. In the present embodiment, however, the shaft 10, which is protected by the mandrel 18, may maintain the spline teeth 14b with high precision.

Figure 7:
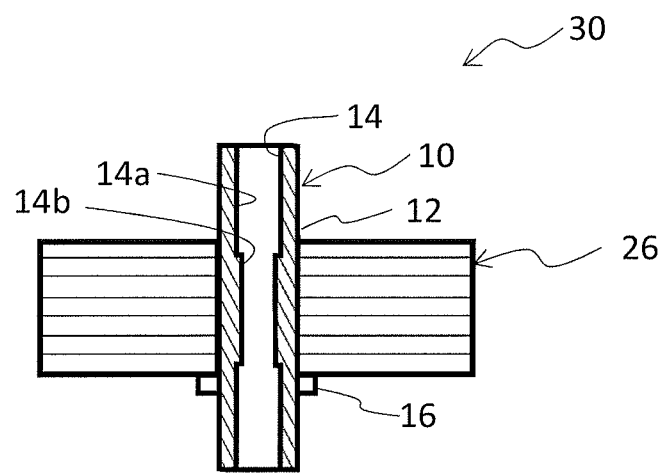
FIG. 7 is a diagram illustrating a state where the mandrel and the die are removed from the shaft in the rotor manufacturing process according to the embodiment.

FIG. 7 illustrates a process following the process in FIG. 6. In FIG. 7, the manufacturing device removes the mandrel 18 and the die 20 from the shaft 10. In this manner, a rotor 30 including the shaft 10 and the rotor core 26 fitted together is formed. A magnet is inserted into the rotor 30, as required. The rotor 30 is further combined with a stator to produce a rotary electric machine, which can be utilized for various purposes, such as a power source of motor-driven vehicles. To mount the rotary electric machine, another shaft having an outer circumferential surface including teeth is inserted into the shaft 10 such that the teeth engage with the spline teeth 14b for use.

As described above, the use of the mandrel 18 applies the internal pressure to the shaft 10, so that the shaft 10, when press fit, is prevented from deforming. Such protection by the mandrel 18 is particularly advantageous for the spline teeth 14b formed on the inner circumferential surface 14 of the shaft 10, whose shape needs to be retained with high precision. The mandrel 18 further enables the press fit of the shaft 10 with greater load as compared to examples without a mandrel. While liquid seal molding, which is a method similar to that of the present embodiment, requires liquid sealing and plastic deformation, the present embodiment, which uses the mandrel 18, can simplify the manufacturing processes.

Figure 8:
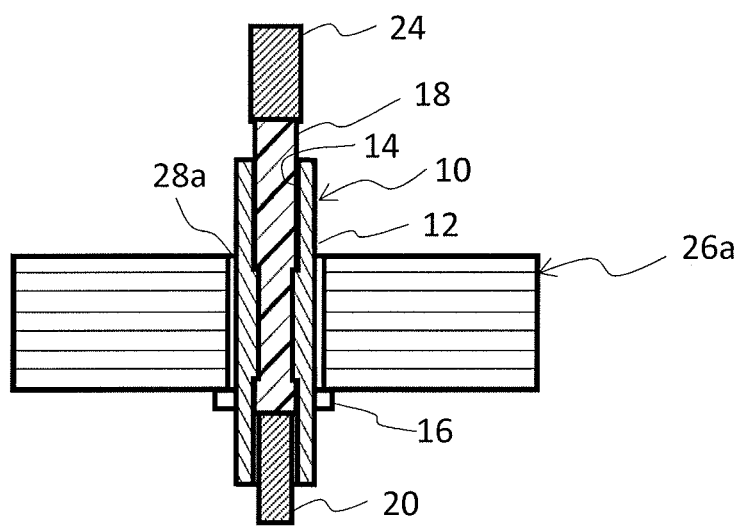
FIG. 8 is a diagram illustrating the rotor manufacturing process by means of a shrink fit according to the embodiment.

Referring now to FIG. 8, fitting by means of a shrink fit will be described. FIG. 8 illustrates one process of the shrink fit. In FIG. 8, elements corresponding to or identical with the elements in FIG. 1 to FIG. 7 are denoted by the corresponding numerical references, and description of these elements will be omitted as required.

FIG. 8 illustrates a state which is similar to the state in FIG. 5; however, FIG. 5 illustrates the rotor core 26 which is maintained at room temperature and the shaft 10 being press fit to the rotor core 26, whereas FIG. 8 illustrates a rotor core 26a heated to 200° C. As the rotor core 26a is thermally expanded, a shaft through hole 28a has an increased internal diameter. The shaft 10 is therefore placed within the shaft through hole 28a without resistance against it.

As in the example illustrated in FIG. 5, the mandrel 18 is inserted into the shaft 10 and is compressed by the die 20 and the pad 24. The mandrel 18, which is to be heated by heat transmitted from the rotor core 26a, is formed of a heat-resistant material.

In the shrink fit, the rotor core 26a in the state illustrated in FIG. 8 is cooled to have a reduced diameter in the shaft through hole 28a, resulting in the state illustrated in FIG. 5. During this process, the shaft 10 is also deformed by the shaft through hole 28a to have a reduced diameter. Particularly, the shaft 10, which is heated by heat from the rotor core 26a and is softened, is easily deformed. In this embodiment, however, as the internal pressure is increased by the mandrel 18, the shaft 10 is harder to deform and has a less deformed cross section from a perfect circle, as compared to examples without the mandrel 18. When the temperature of the rotor core 26a lowers back to room temperature, the mandrel 18 is removed. This process is similar to those described with reference to FIG. 6 and FIG. 7.

Similar to the shrink fit described above, a cool fit may also be adapted to perform a fit. In a cool fit, in place of heating the rotor core 26a, the shaft 10 is cooled to have a reduced diameter. Both heating of the rotor core 26a and cooling of the shaft 10 may be performed.

In the examples described above, the mandrel 18 has a cylindrical shape, whereas the inner circumferential surface 14 of the shaft 10 includes the cylindrical portion 14a and the spline teeth 14b. The projections of the spline teeth 14b protrude further inward with respect to the cylindrical portion 14a. This configuration causes the mandrel 18, when axially compressed, to strongly urge against the projections of the spline teeth 14b but not to urge against the recesses of the spline teeth 14b. The cylindrical portion 14a is urged with a smaller force than that for the projections of the spline teeth 14b. As deformation of the spline teeth 14b should be avoided most, it is advantageous to urge the projections of the spline teeth 14b strongly.

It is also advantageous to form the mandrel 18 in accordance with the inner circumferential surface 14 of the shaft 10. Specifically, the mandrel 18 may have recesses and projections to correspond to the recesses and projections of the spline teeth 14b. Alternatively, the mandrel 18 may have a greater external diameter corresponding to the diameter of the cylindrical portion 14a at a portion closer to the insertion port of the shaft 10 with respect to the spline teeth 14b. These configurations enable the inner circumferential surface 14 of the shaft 10 to be pressed relatively uniformly.

REFERENCE SIGNS LIST 10 shaft, 12 outer circumferential surface, 14 inner circumferential surface, 14a cylindrical portion, 14b spline teeth, 16 annular member, 18 mandrel, 20 die, 22 arrow, 24 pad, 26, 26a rotor core. 28, 28a shaft through hole, 30 rotor.

The invention claimed is:

1. A method of manufacturing a rotor, comprising:
   inserting an elastic member into a hollow cylindrical shaft and axially compressing the elastic member, wherein the shaft has a hollow shape having a through hole axially extending from a first end to a second end, and then fitting the shaft to a shaft through hole of a rotor core; and
   after the fitting, releasing or reducing compression of the elastic member and removing the elastic member out of the shaft.

2. The method according to claim 1, wherein
   the shaft is fit to the shaft through hole by means of an interference fit.

3. The method according to claim 2, wherein
   the fitting comprises:
   maintaining the axial compressing of the elastic member inserted into the shaft, and
   with the elastic member being axially compressed, press fitting the shaft to the shaft through hole of the rotor core.

4. The method according to claim 2, wherein
the fitting comprises:
heating the rotor core to increase a diameter of the shaft through hole, and
with the elastic member being axially compressed, disposing the shaft in the shaft through hole having an increased diameter; and
cooling the rotor core to reduce the diameter of the shaft through hole, to thereby fit the shaft to the shaft through hole.

5. The method according to claim 1, wherein
the inserting comprises:
inserting a die from the first end of the shaft;
inserting the elastic member from the second end of the shaft; and
pressing the elastic member from the second end of the shaft toward the die to compress the elastic member.

6. The method according to claim 1, wherein
the shaft has an inner circumferential surface including spline teeth.

\* \* \* \* \*